US012682732B2

(12) United States Patent
Thadisetty et al.

(10) Patent No.: US 12,682,732 B2
(45) Date of Patent: Jul. 14, 2026

(54) METHOD AND APPARATUS FOR IDENTIFYING AND RELAYING AUDIO SEGMENTS OF INTEREST IN A MONITORED SECURITY ENVIRONMENT

(71) Applicant: The ADT Security Corporation, Boca Raton, FL (US)

(72) Inventors: Bhaskar Thadisetty, Boca Raton, FL (US); Isabel Fernandez, Lauderdale by the Sea, FL (US); Steven Alfonse Zaccardi, Coral Springs, FL (US)

(73) Assignee: The ADT Security Corporation, Boca Raton, FL (US)

( * ) Notice: Subject to any disclaimer, the term of this patent is extended or adjusted under 35 U.S.C. 154(b) by 227 days.

(21) Appl. No.: 18/478,507

(22) Filed: Sep. 29, 2023

(65) Prior Publication Data

US 2025/0111763 A1 Apr. 3, 2025

(51) Int. Cl.
G08B 13/16 (2006.01)
G10L 17/22 (2013.01)
G10L 25/84 (2013.01)

(52) U.S. Cl.
CPC .......... G08B 13/1672 (2013.01); G10L 17/22 (2013.01); G10L 25/84 (2013.01)

(58) Field of Classification Search
CPC ..... G08B 13/1672; G10L 17/22; G10L 25/84; G10L 25/51
See application file for complete search history.

(56) References Cited

U.S. PATENT DOCUMENTS

| | | | |
|---|---|---|---|
| 10,354,351 B2 | 7/2019 | Orduna et al. | |
| 10,691,512 B1 | 6/2020 | Patton et al. | |
| 11,417,128 B2 | 8/2022 | Law et al. | |
| 2019/0188980 A1* | 6/2019 | Viswanathan | ... G08B 13/19684 |
| 2019/0295207 A1 | 9/2019 | Day et al. | |
| 2020/0066257 A1 | 2/2020 | Smith et al. | |
| 2020/0274962 A1 | 8/2020 | Martin et al. | |

(Continued)

OTHER PUBLICATIONS

A. Schindler et al.; Large Scale Audio-Visual Video Analytics Platform for Forensic Investigations of Terroristic Attacks; 25th International Conference, MMM 2019, consisting of 13-pages.

(Continued)

*Primary Examiner* — Davetta W Goins
*Assistant Examiner* — Sharmin Akhter
(74) *Attorney, Agent, or Firm* — Weisberg I.P. Law, P.A.

(57) ABSTRACT

An apparatus and method are disclosed. In an embodiment, an audio analysis device is provided. The audio analysis device is configured to receive administrator criteria that specifies an alarm event handling response, obtain an audio file associated with a monitored security environment. detect an audio anomaly in the audio file, and in response to detecting the audio anomaly, generate an audio segment based on the audio anomaly, the audio segment comprising the audio anomaly. The audio analysis device is further configured to generate metadata comprising a characteristic associated with the audio segment, determine that the administrator criteria specifies providing the audio segment and the metadata in an agent portal, and in response to the administrator criteria, encode the audio segment and the metadata for rendering in the agent portal.

18 Claims, 6 Drawing Sheets

(56) References Cited

U.S. PATENT DOCUMENTS

| 2021/0082259 A1 | 3/2021 | Coles |
| 2021/0327255 A1 | 10/2021 | Brown et al. |
| 2022/0358952 A1 | 11/2022 | Abesser |
| 2024/0029546 A1* | 1/2024 | Lopareva ................ G01S 7/415 |

OTHER PUBLICATIONS

D. Smazinka et al., Safety in Cities and Transport through Sound Monitoring; Communications, Sep. 2022, consisting of 11-pages.

* cited by examiner

METHOD AND APPARATUS FOR IDENTIFYING AND RELAYING AUDIO SEGMENTS OF INTEREST IN A MONITORED SECURITY ENVIRONMENT

TECHNICAL FIELD

The present technology is generally related to detecting and handling audio anomalies in a monitored security environment.

BACKGROUND

Many environments, such as inside a vehicle, or at a home or business, are monitored for the occurrence of an event that impacts the safety or security of the occupants. Some existing systems rely on a physical sensor being tripped or on a user performing some action in order for the system to determine such an event has occurred.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accom-plished by physical contact, induction, electromagnetic radiation, radio signaling, infrared signaling or optical sig-naling, for example. Multiple components may interoperate and modifications and variations are possible to achieve the electrical and data communication.

In some embodiments described herein, the term "coupled," "connected," and the like, may be used herein to indicate a connection, although not necessarily directly, and may include wired and/or wireless connections.

Example embodiments may be understood in light of the following terms.

Figure 1:
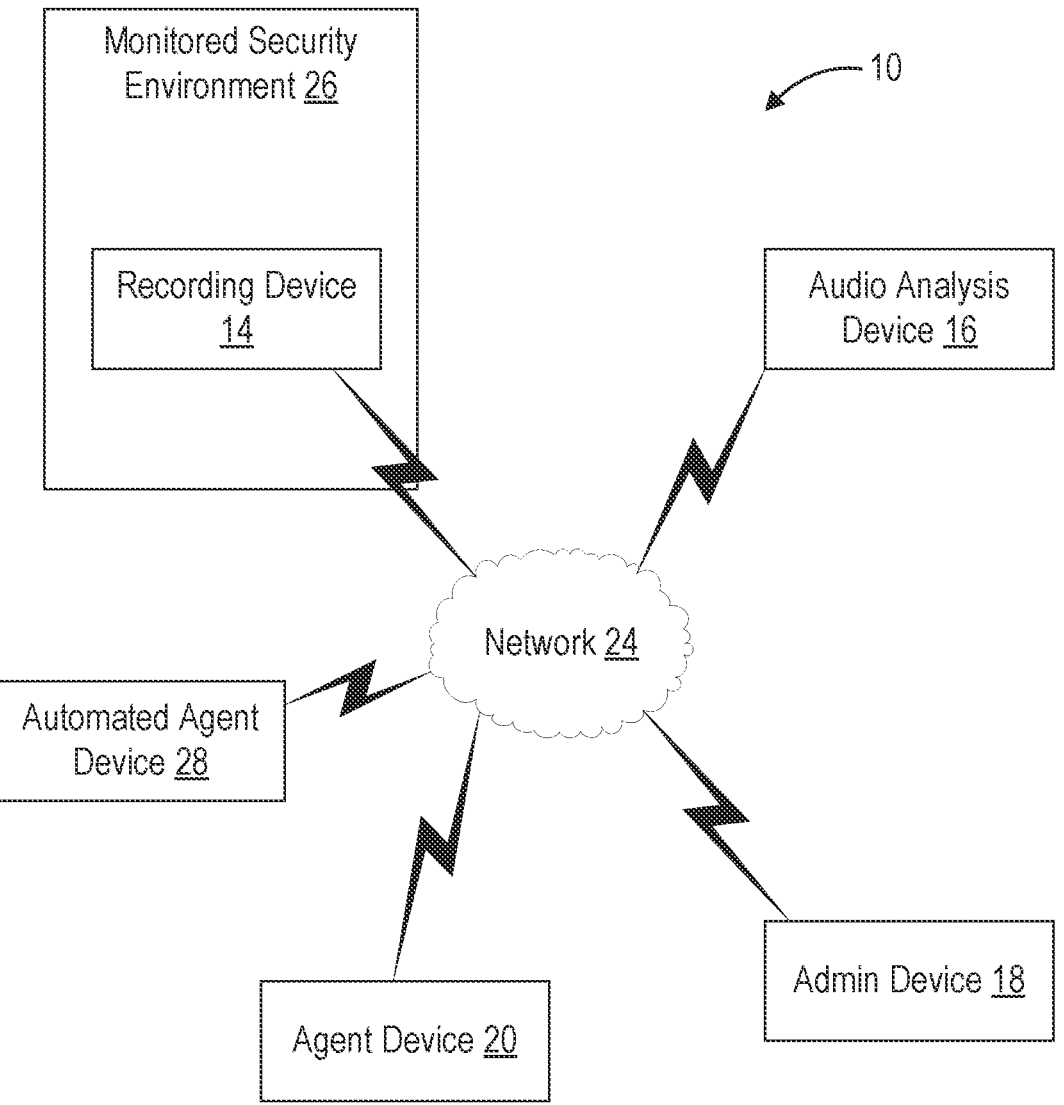
FIG. 1 is a diagram of an example system according to some embodiments of the present disclosure.

Referring to the drawing figures, in which like elements are referred to by like reference numerals, there is shown in FIG. 1 an example system 10.

System 10 may include a recording device 14 configured to record audio at a monitored security environment 26. The recording device 14 may include, e.g., one or more micro-phones, cameras, and/or other hardware suitable for record-ing an audio file and transmitting the audio file, such as via a network 24. The monitored security environment 26 includes any environment that is being monitored including but not limited to security purposes. Examples of monitored security environments 26 include the interior of a vehicle, a home, or other environments where security monitoring may be desirable. Recording device 14 may be situated on, in or adjacent to the monitored security environment 26 to record audio relating to occurrences at the monitored security environment 26.

System 10 may include an audio analysis device 16 for performing various functionalities associated with detecting and handling audio anomalies in a monitored security envi-ronment 26, including those described herein. System 10 may include an administrator device 18 for configuring one or more parameters, such as administrator criteria, relating to the handling of a detected audio anomaly. System 10 may include an agent device 20 for display of information relating to the audio anomaly to a human agent. As used in various embodiments, "Human Agent" may refer to a bio-logical human that executes an action(s) (standard operating procedure) in response to a Sound of Interest, such as by way of an agent device. As used in various embodiments, "Stan-dard Operating Procedure" may refer to a list of approved actions to take based on real-time assessment by the agent, such as via an agent device.

Agent device 20 may also include functionality that may be initiated by a human agent such as performing one or more actions relating to the sound anomaly, such as con-tacting a user or emergency services. Agent device 20 may include hardware such as input and/or output devices and display devices to enable a human agent to initiate actions relating to handling of a detected audio anomaly. System 10 may include an automated agent device 28, which may be configured to perform handling and/or disposition of events relating to the audio anomaly in an automated fashion, i.e., without further human intervention.

As noted above, system 10 may include network 24 (which may refer to a plurality of networks), which may be configured to provide direct and/or indirect communication among one or more entities in system 10 (e.g., among one or more of recording device 14, audio analysis device 16, administrator device 18, and agent device 20). Although network 24 is shown as an intermediate network between components and/or devices of system 10, any component or device may communicate directly with any other compo-nent/device of system 10.

Figure 2:
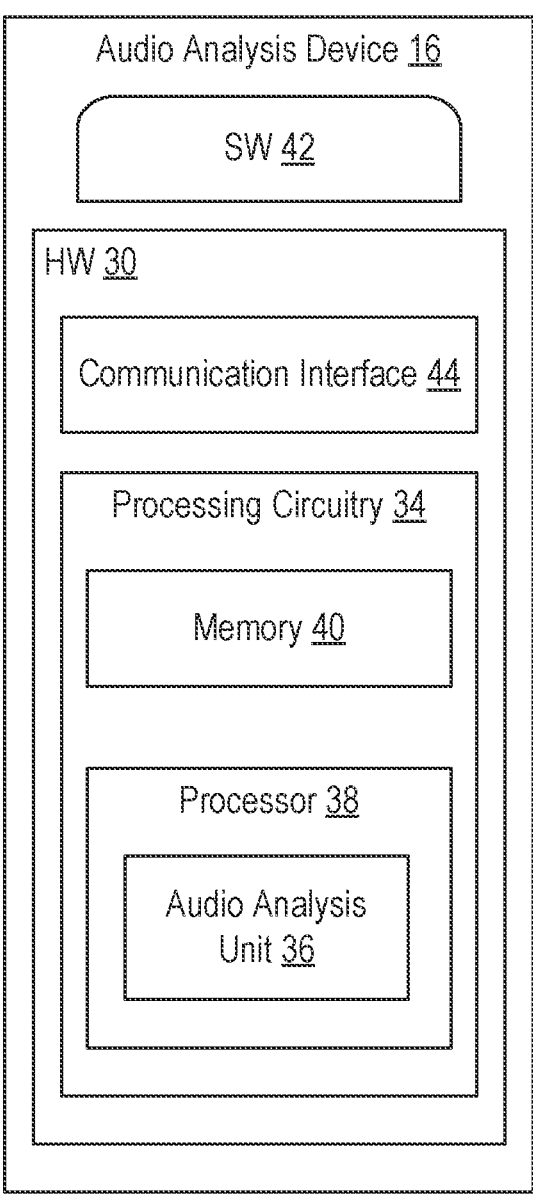
FIG. 2 is a block diagram of an example of an audio analysis device in the system of FIG. 1 according to some embodiments of the present disclosure.

Example implementations, in accordance with embodi-ments of system 10 discussed in the preceding paragraphs will now be described with reference to FIG. 2. The audio analysis device 16 includes hardware 30. The hardware 30 may include processing circuitry 34. The processing circuitry 34 may include a processor 38 and a memory 40. In addition to or instead of a processor 38, the processing circuitry 34 may comprise integrated circuitry for processing and/or control, e.g., one or more processors and/or processor cores, field programmable gate arrays (FPGAs), and/or application specific integrated circuits (ASICs) adapted to execute instructions. The processor 38 may be configured to access (e.g., write to and/or read from) the memory 40, which may comprise any kind of volatile and/or nonvolatile memory, e.g., cache, buffer memory, random access memory (RAM), read-only memory (ROM), optical memory, and/or erasable programmable read-only memory (EPROM). Further, memory 40 may be configured as a storage device. The processing circuitry 34 may be configured to perform various functionality described herein. For example, computer instructions may be stored in memory 40 and/or another computer-readable medium that, when executed by the processor 38, cause the processor 38 to perform various functionality.

Hardware 30 of audio analysis device 16 may include communication interface 44 enabling audio analysis device 16 to communicate with any component or device of system 10. For example, communication interface 44 may be configured for establishing and maintaining at least a wireless or wired connection with any component or device of system 10, such as recording device 14, administrator device 18, agent device 20, etc. The communication interface 44 may be formed as or may include, for example, one or more radio frequency (RF) transmitters, one or more RF receivers, and/or one or more RF transceivers.

Audio analysis device 16 further has software 42 stored internally in, for example, memory 40, or stored in external memory (e.g., database, storage array, network storage device, etc.) accessible by the audio analysis device 16 via an external connection. Software 42 may include any software or program configured to perform the steps or processes of the present disclosure, e.g., providing an interface for a user to provide an input to the audio analysis device 16 and/or receive an output from the audio analysis device 16. Further, software 42 may run and/or be included directly as part of audio analysis device 16. Software 42 may execute on a virtual machine and/or execute outside audio analysis device 16 and/or any of the components thereof.

The processing circuitry 34 may be configured to control any of the methods and/or processes described herein and/or to cause such methods, and/or processes to be performed, e.g., by audio analysis device 16. Processor 38 corresponds to one or more processors 38 for performing audio analysis device 16 functions described herein. The memory 40 is configured to store data and/or files such as system data and/or other information/data described herein. In some embodiments, the software 42 may include instructions that, when executed by the processor 38 and/or processing circuitry 34, causes the processor 38 and/or processing circuitry 34 to perform the processes described herein with respect to audio analysis device 16. For example, processing circuitry 34 of the audio analysis device 16 may include audio analysis unit 36, which may be configured to perform any of the processes, steps, or functions described herein.

Figure 3:
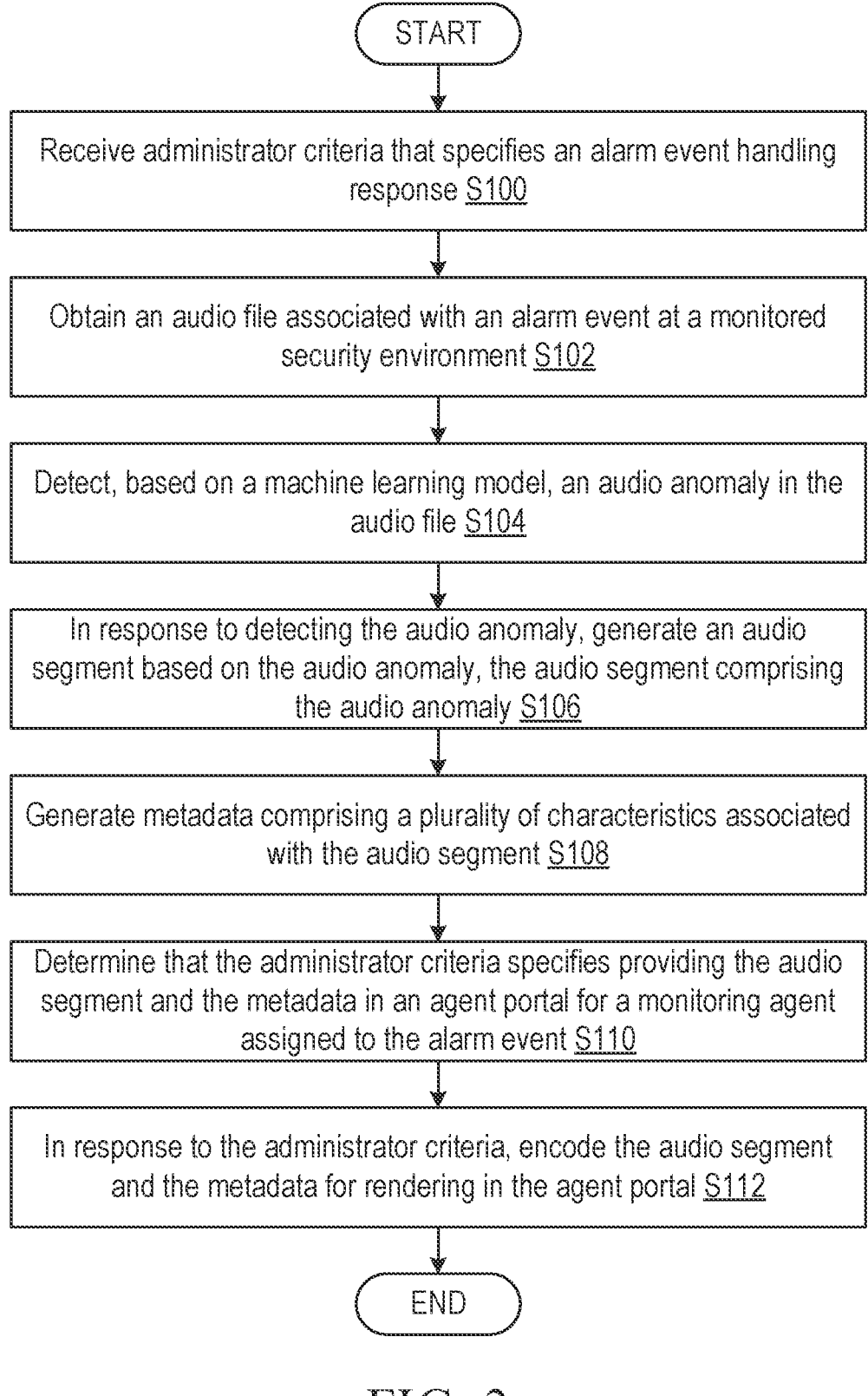
FIG. 3 is a flowchart of an example process performed in the system of FIG. 1 according to some embodiments of the present disclosure.

FIG. 3 is a flowchart of an example process implemented by audio analysis device 16 according to some embodiments of the present disclosure. One or more blocks described herein may be performed by one or more elements of audio analysis device 16, such as by one or more of processing circuitry 34 (including the audio analysis unit 36) and/or processor 38 and/or communication interface 44. Audio analysis device 16 is configured to receive administrator criteria that specifies an alarm event handling response (Block S100). Audio analysis device 16 is configured to obtain an audio file associated with an alarm event at a monitored security environment (Block S102). Audio analysis device 16 is configured to detect, based on a machine learning model, an audio anomaly in the audio file (Block S104).

Audio analysis device 16 is configured to perform one or more functions that may be triggered by the detection of the audio anomaly. For example, audio analysis device 16 may, in response to detecting the audio anomaly, generate an audio segment based on the audio anomaly, where the audio segment comprises the audio anomaly (Block S106). Audio analysis device 16 may generate metadata comprising a plurality of characteristics associated with the audio segment (Block S108). The plurality of characteristics associated with the audio segment may comprise one or more of, e.g., a description of the audio anomaly; a secret phrase; a description of at least one other sound in the audio segment; a location where the audio file was recorded; an identity of at least one person present at the location; a number of distinct speakers having voices present in the audio segment; a distance between a source of the audio anomaly and the audio recording device; or an identity of at least one background noise in the audio segment. Audio analysis device 16 may determine that the administrator criteria specifies providing the audio segment and the metadata in an agent portal for a monitoring agent assigned to the alarm event (Block S110). An agent portal may be, e.g., an interface displayed on an agent device 20. Audio analysis device 16 may, in response to the administrator criteria, encode the audio segment and the metadata for rendering in the agent portal (Block S112).

In some embodiments, the generating of the metadata uses a machine learning (ML) model.

In some embodiments, the audio analysis device 16 is further configured to receive resolution information relating to the audio anomaly, and train, based on the resolution information, the ML model.

In some embodiments, the audio analysis device 16 is further configured to receive at least one change to the ML model, and perform, based on the at least one change to the ML model and on determining not to transmit, a further analysis of the audio file. The audio analysis device 16 is further configured to, based on the further analysis, one of transmit the audio file to the agent device 20 or mark the audio file for deletion, or may decide to apply a subsequent "attuned" model, e.g., as part of a secondary analysis as described elsewhere herein.

In some embodiments, the generating of the metadata comprises assigning, based on the administrator criteria, a respective priority weight to each of the plurality of characteristics. The audio analysis device 16 is further configured to select, based on the administrator criteria and the respective priority weights, a subset of the metadata for rendering in the agent portal, and cause the subset of the metadata to be encoded for rendering in the agent portal.

In some embodiments, the audio analysis device 16 is further configured to cause the at least one processor 38 to select a subset of the metadata by at least selecting individual ones of the characteristics that have a respective priority weight above a priority threshold, where the priority threshold is based on the administrator criteria.

In some embodiments, the audio analysis device 16 is further configured to increase, based on the metadata, a length of the audio segment.

Having described the general process flow of arrangements of the disclosure and having provided examples of hardware and software arrangements for implementing the processes and functions of the present disclosure, the sections below provide details and examples of arrangements for detecting and handling audio anomalies in a monitored security environment. One or more audio analysis device 16 functions described below may be performed by one or more of processing circuitry 34, processor 38, audio analysis unit 36, etc.

Example scenarios in which the system 10 may be used include any environment that is being monitored (e.g., monitored security environment 26) such as the interior of a vehicle, inside a house, and other definable areas where sound will travel can be audio-monitored. A "sound" in various embodiments may be, e.g., a distinct piece of audio identifiable with a particular source. For example: sounds may include police sirens, tire screeching, or dog barking.

Analysis of the audio environment within a monitored space is possible by a variety of methods and devices such as by way of a recording device 14 with the capability of capturing audio to be transmitted or otherwise accessed (e.g., by the audio analysis device 16). The audio itself in the form of an audio file can be analyzed in digital form (electronically by software and computer elements such as those of the audio analysis device 16) or analog form by a human (e.g., via an agent device 20).

Described herein are embodiments relating to the application of various tools at different points through the lifecycle of an audio segment (a segment of the audio file) relating to the analysis and identification of segment(s) of interest (e.g., audio anomalies) in the audio file. The results of the analysis may be used to provide a monitoring agent (e.g. on an agent device 20) with visual information related to the segments of interest in the audio identified by the analysis tools. The method and apparatus of relaying and conveying this information to a monitoring agent, automated or human, as well as the related audio, may be based on a scalable prioritization-severity scheme.

In an example embodiment, a ML model (e.g., as part of the audio analysis device 16) can be used to perform real-time analysis on one or more audio files to send events to a monitoring agent (e.g., automated agent device 28 or agent device 20) based on sounds that may be indicative of a safety concern, such as screaming, shouting, gunshots, or breaking glass.

As used in various embodiments, "Event" may refer to the data relating to the Area Monitored (e.g. monitored security environment), Audio Segment of Interest, Sound of Interest, Audio Metadata and Event Metadata. As used in various embodiments, "Event Metadata" may refer to the data (e.g., as part of metadata) associated with the non-audio elements of the Area Monitored that accompanies an Event. As used in various embodiments, "Area Monitored" may refer to the physical location that is within the boundaries of detectable audio based on the listening devices (e.g., recording device) installed (e.g., one or more recording devices). In some embodiments, the enablement of the listening devices may be in use cases where monitoring is not continuous (e.g., only during an active ride-share with a rider in vehicle, or only during school hours at an elementary school).

Speech to text conversion may be performed by, e.g., the audio analysis device 16, and may be used in real-time to assist in AI analysis (e.g., using the ML model). In some embodiments, users can create a secret phase that will also trigger an event. The audio analysis device 16 may be configured to recognize the secret phase, and may do so by converting speech to a text format that can be used to detect the secret phase. In some embodiments, text conversion may be used to identify, e.g., profanity or screams. In some embodiments, text conversion may be used when administrator criteria include a threshold setting for speech, in which case the generated metadata may include a transcription of the speech.

Devices in the monitored area (e.g., one or more recording devices 14 in a monitored security environment 26) may be "always on" or controlled to enter listening mode as the applied use case requires. These devices may detect anomalies in the monitored area and may send real-time location or other associated recording-device-generated metadata related to the incident to the system 10, which may be acted upon by automation (e.g. via an automated agent device 28) and/or a human agent (e.g. via the agent device 20). Such recording-device-generated metadata may include, e.g., a time, date, and location associated with a recording, and may be used by the audio analysis device 16 to generate metadata.

Examples of actions that may be performed by an automated agent device 28 include machine generated text messages and notifications sent to a user to check-in to provide a status and determine follow-up actions.

An incident relating to an audio anomaly may be handled within the Automated Agent flow (e.g. via the automated agent device 28) or redirected to a human agent (e.g. via the agent device 20) based on administrator criteria (e.g., criteria provided via the administrator device 18). As used in various embodiments, "Automated Agent" may refer to a software and/or hardware agent that executes an action(s) (standard operating procedures) in response to a Sound of Interest without Human Agent intervention. In various embodiments, an automated agent may be part of and/or encompass the functionality of the audio analysis device. In some embodiments, administrator criteria may be used to determine whether to transmit a Sound of Interest to a human agent (e.g., via an agent device 20) as well as how long to retain data relating to an Audio Segment continuing a Sound of Interest in storage (i.e., before deleting it), as well as when to apply subsequent models (e.g., secondary analysis as described herein) to the Sound of Interest for further analysis.

Based on the output of the AI Analysis stage (e.g., via the audio analysis device 16), the Audio Segment of Interest length for Human Agent consumption (e.g., via the agent device 20) can be expanded to add contextual information before and/or after the Sound of Interest. As used in various embodiments, "Audio Segment of Interest" may refer, e.g., to a portion of audio of a specific duration, e.g., an audio segment, that contains one or more Sound(s) of Interest, e.g., an audio anomaly. As used in various embodiments, "Sound of Interest" may refer to the identifiable audio being monitored for, e.g., an audio anomaly. For example, within an example monitored security environment, it may be desirable that audio anomalies identified as gunshots will result in an alarm event. Example Sounds of Interest include gunshot, sirens, fire/$CO_2$ alarm, glass break, and water running.

Secondary audio analysis on the Segment of Interest may be performed to contextualize the Segment in relation to the Sound of Interest, adding to the relevancy of the associated metadata. The secondary audio analysis may include, e.g., to re-training the ML model based on, e.g., an outcome of the event or human agent feedback relating to the event, to improve the model in the future. Secondary analysis may also be performed using a special-purpose ML model selected based on context data, e.g., a model specifically tuned for a narrow category of audio anomalies.

Application of specific AI models (e.g., ML models) to perform secondary analysis dynamically applied based on Area Monitored and the environmental particulars therein or the Audio Segment of Interest's associated metadata, may improve relevancy and accuracy of the information displayed to the Human Agent. This information can also be displayed or suppressed (due to, e.g., irrelevancy in context) to the Human Agent based on the outcomes of the secondary analysis.

The source of the audio from the Monitored Area can be a secondary element of an alternative primary source, such as the audio component of a video stream, or the background audio of a voice call.

Before audio previously deemed uneventful is deleted from storage, the Automated Agent can request a further analysis using Model' (e.g., a ML model that is different from the ML model used for the original analysis) to that data to determine (e.g., via the audio analysis device 16) if changes to the ML model that were developed in the interim may detect audio anomalies in the audio segments of interest prior to deletion of the audio segment. As used in various embodiments, "Model and Model' (model prime)" may refer to a representation of each of two states in time of an AI inference model, (e.g., an ML model). Model may refer to the instance of the model at time of Event. Model' may refer to the state of the model at a later time.

The automated agent device 28 may be capable of performing functions such as but not limited to: metadata operations by an automated agent, close incidents relating to audio anomalies based on human customer feedback, perform automated agent functions such as dispatch, and/or handing over to a human agent (e.g., via an admin device as a result of an analysis by the audio analysis device 16) based on a threshold of decision criteria (as set by administrator criteria and/or ML model and priority weighting).

The agent device 20 may be used for display of metadata associated with an audio segment or audio anomaly, which may be prioritized (e.g. via the audio analysis device 16), such as during assignment of an Event relating to the audio anomaly to a Human Agent.

Prioritization of the displayed Metadata relating to the audio segment or audio anomaly to the Human Agent may be determined by a combination of an administrator configuration (e.g., administrator criteria received from an administrator device 18) and the output of the AI Analysis operation as determined by the system configuration. This applied value to each piece of metadata may be the Prioritization Weighting. "Prioritization Weighting" as used in various embodiments may refer to a value (e.g., priority weight) attached to each piece for Audio Metadata based on system configuration that affects its presentation in the Human Agent Console (e.g., agent device) and its storage in a system data store. The higher the Prioritization Weighting, the more prevalent the Sound of Interest in its presentation to the Human Agent and the greater its effect on training the system's AI Models (e.g., ML model).

The display of Audio Metadata and Sound(s) of Interest within the agent device 20 may depend on the Prioritization Weighting and the system configuration (e.g., administrator criteria). As used in various embodiments, "Audio Metadata," e.g., metadata, may refer to the collection of descriptions in human language after AI Analysis (by, e.g., the audio analysis device) of the Sound(s) of Interest (e.g., audio anomaly, from the Segment of Interest (e.g., audio segment) that accompanies an Event.

In an example embodiment, for a given system configuration, a Gunshot Sound of Interest (e.g. audio anomaly identified as being a gunshot) may be weighted higher than a Screeching Tires Sound of Interest (e.g., another audio anomaly in the segment identified as being screeching tires). Based on the respective weights of each, the gunshot may be above the threshold setting, and the tires screeching below the threshold setting. As a result, the gunshot may be the only Sound of Interest (e.g., audio anomaly) presented by the agent device 20 (e.g., as a result of an analysis by the audio analysis device 16).

Metadata may include characteristics such as but not limited to textual identification of the Sound of Interest (e.g. "Gunshot," "Glass Break") (which may also be referred to as contextual information); a secret phrase (and the phrase text); identified distinct sounds within the monitored security environment 26 (which may provide context information for secondary sounds); global positioning system (GPS) location(s) recorded during or relating to the audio segment; known and unknown individuals within the monitored security environment 26 during the recording of the audio segment; when speech is detected, how many individual speakers are heard in the Segment of Interest (i.e., audio segment); distance of the sound of interest from the device (e.g., distance between the recording device 14 and the source of the audio anomaly); defining of background sounds in the segment of interest (which may be recorded in a database or data storage and which may not be presented to a human agent); and a Human Agent's incident disposition resolution information. The disposition resolution information may relate to actions taken when a human agent reviews an assigned incident. For example, the human agent may identify and/or summarize the incident by selecting a corresponding disposition. Examples of dispositions include, e.g., "POLICE NOTIFIED" if, e.g., the incident warrants notifying law enforcement, such as if the sound is confirmed as a gun shot. In this case, the human agent may select "POLICE NOTIFIED" as disposition for the incident.

Figure 4:
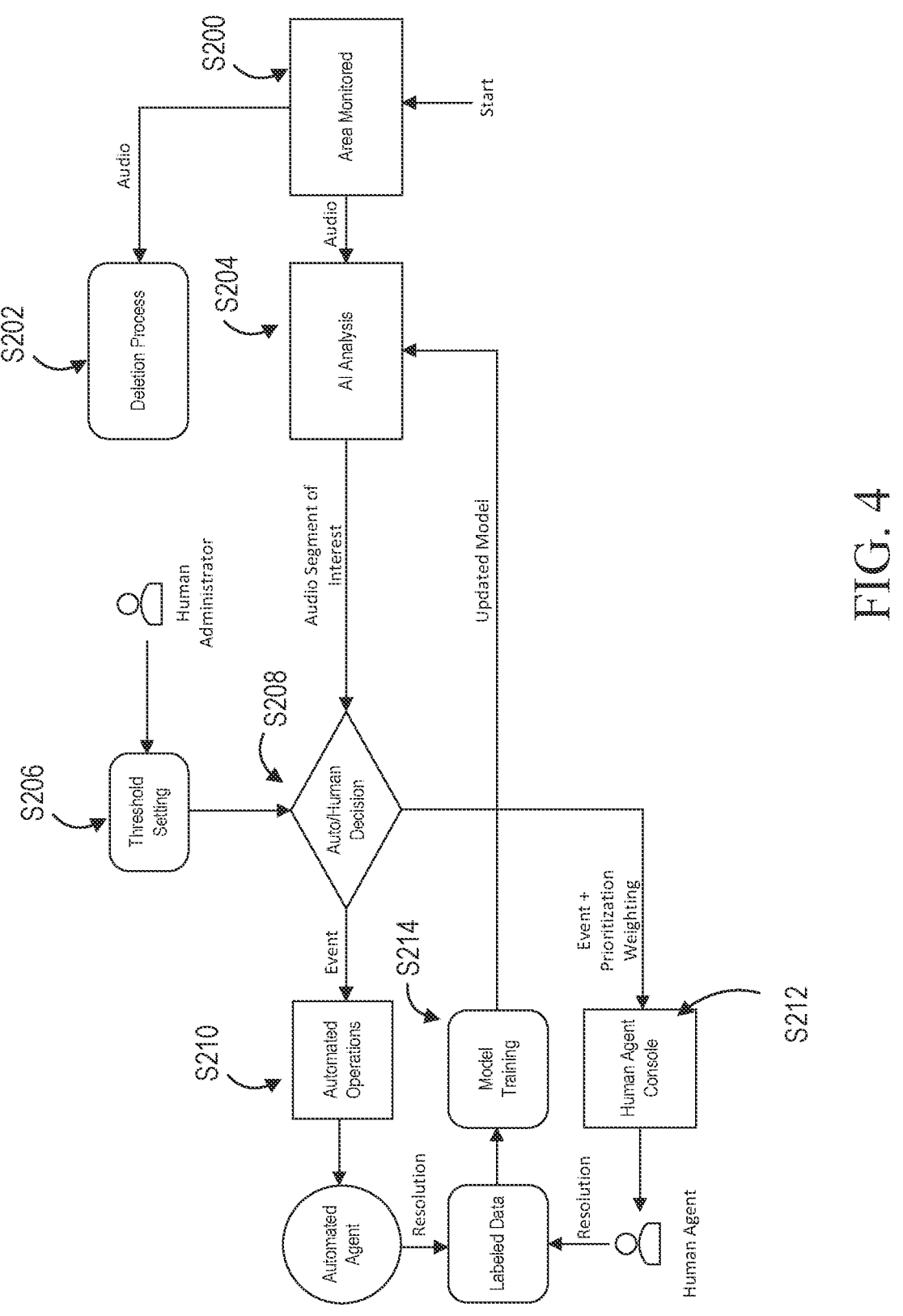
FIG. 4 is another flowchart of an example process performed in the system of FIG. 1 according to some embodiments of the present disclosure.

A flowchart of an example of incident resolution is provided in FIG. 4. Audio is obtained from a monitored security environment 26 (e.g., area monitored) in the form of an audio file (Block S200). The audio file may be deleted (Block S202) based on the result of an AI analysis (e.g., an analysis performed by the audio analysis device 16 using an ML model) (Block S204) in conjunction with a threshold setting of an administrator (Block S206) or may be routed for an AI or human decision (Block S208). Operations may be performed based on the audio file by one or both of an automated agent, e.g., via an automated agent device 28, and a human agent, e.g., via an agent device 20 (Blocks S210 and S212). Examples of "operations" as used in various embodiments include, e.g., closing the incident related to the audio file or routing the incident to an agent based on user (e.g., end-user or customer) feedback. The ML model may be trained based on the operations performed (Block S214).

Figure 5:
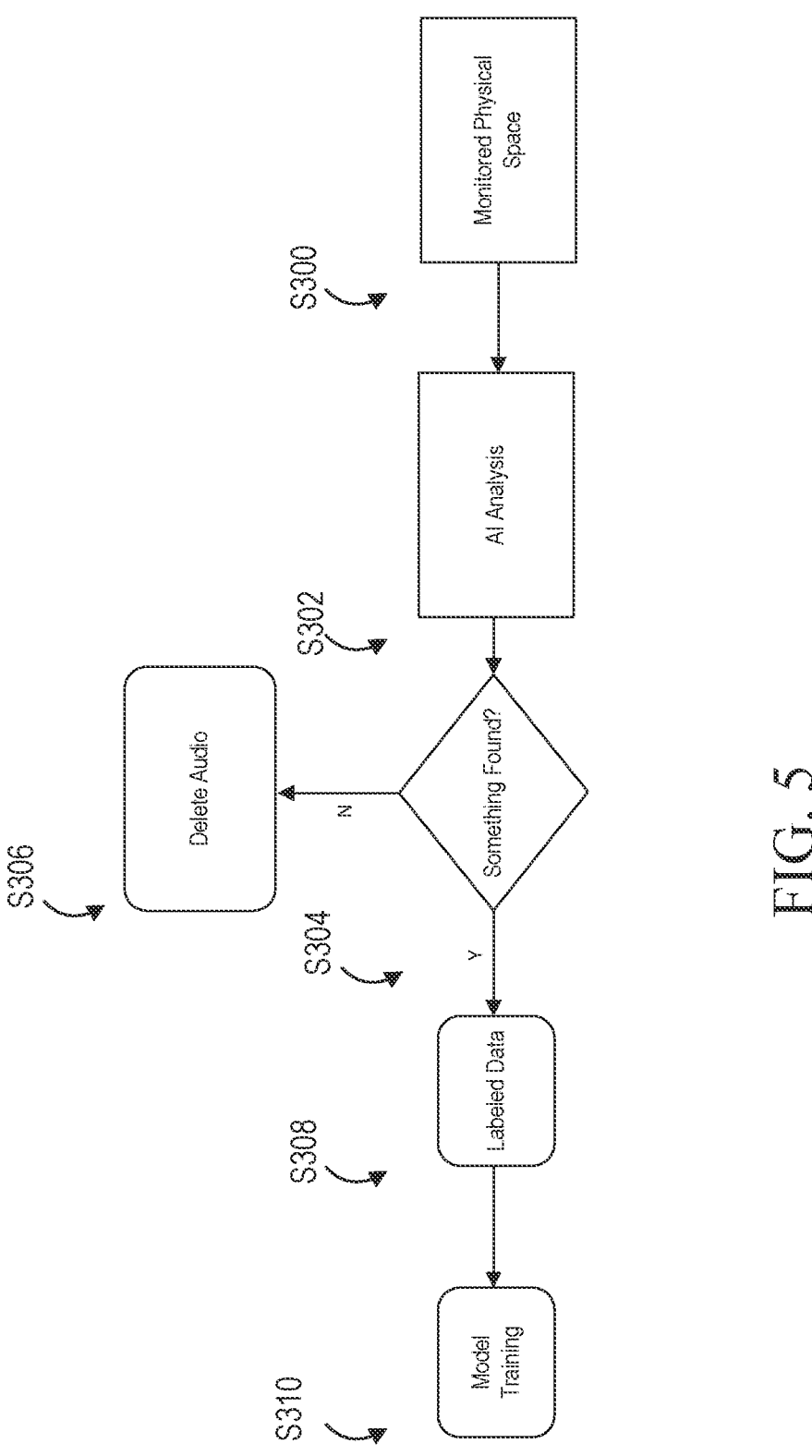
FIG. 5 is another flowchart of an example process performed in the system of FIG. 1 according to some embodiments of the present disclosure.

A flowchart of an example of further or secondary analysis of an audio segment is provided in FIG. 5. The audio segment may be an audio segment that was previously determined by the audio analysis device 16 not to contain an audio anomaly, or that contained an audio anomaly that did not rise to the threshold criteria (e.g., based on administrator criteria) to be presented to an automated or human agent (e.g., via the automated agent device 28 or agent device 20, respectively). An audio file is obtained from a monitored physical space, e.g., monitored security environment 26 (Block S300). An AI analysis is performed, e.g., by the audio analysis device 16 as described elsewhere herein (Block S302). If an audio anomaly is not detected, the audio file is marked for deletion (Block S306). This may be performed, e.g., based on a data retention policy. If an audio anomaly is detected (Block S304), then labeled data (e.g., metadata) is generated (Block S308). In at least one embodiment, "labelled data" contains metadata that is understandable by the system 10 for ML model training. The outcome of the analysis may be further used to train the ML model, e.g., the ML model used by the audio analysis device 16 (Block S310).

Figure 6:
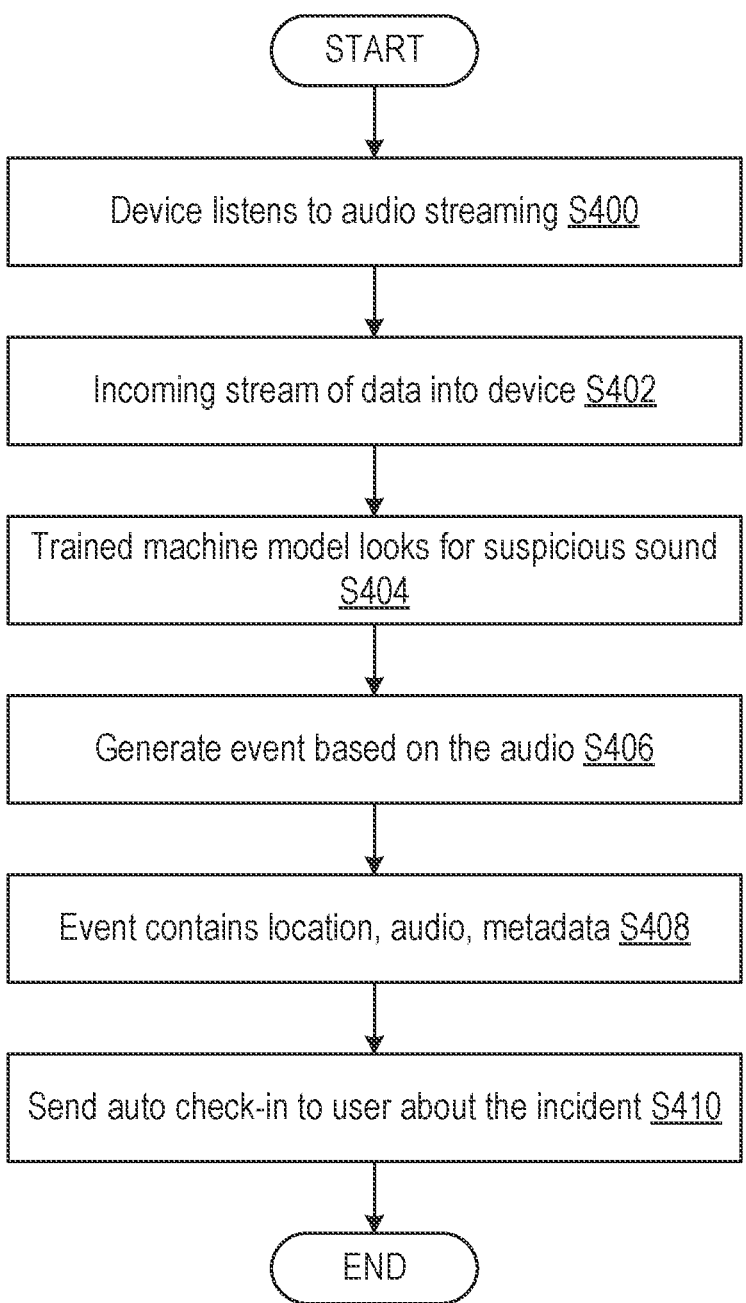
FIG. 6 is another flowchart of an example process performed in the system of FIG. 1 according to some embodiments of the present disclosure.

FIG. 6 depicts another example method, such as performed by the audio analysis device 16. A device listens to, e.g. receives, audio streaming (Block S400). An incoming stream of audio data is provided to the device (Block S402). A trained ML model looks for a suspicious sound (Block S404). An event is generated based on the audio (Block S406). The event contains location, audio, and metadata (Block S408). An auto check-in may be sent to a user about the incident (i.e., event) (Block S410).

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. An audio analysis device, the audio analysis device comprising:

at least one processor; and memory comprising a plurality of instructions that, when executed by the at least one processor, are configured to cause the at least one processor to:

receive administrator criteria that specifies an alarm event handling response;

obtain an audio file associated with an alarm event at a monitored security environment;

detect, based on a machine learning model, an audio anomaly in the audio file;

in response to detecting the audio anomaly:

generate an audio segment based on the audio anomaly, the audio segment comprising the audio anomaly;

generate metadata based on a first machine learning (ML) model and by assigning, based on the administrator criteria, a respective priority weight to each of a plurality of characteristics associated with the audio segment, at least one of the plurality of characteristics comprising:

a description of the audio anomaly;

a secret phrase;

a description of at least one other sound in the audio segment;

a location where the audio file was recorded;

an identity of at least one person present at the location;

a number of distinct speakers having voices present in the audio segment;

a distance between a source of the audio anomaly and the audio recording device; or an identity of at least one background noise in the audio segment;

determine that the administrator criteria specifies providing the audio segment and the metadata in an agent portal for a monitoring agent assigned to the alarm event;

select, based on the administrator criteria and the respective priority weight of each of the plurality of characteristics, a subset of the metadata for rendering in the agent portal; and encode the audio segment and the subset of the metadata for rendering in the agent portal.

2. The audio analysis device of claim 1, wherein the plurality of instructions is further configured to cause the at least one processor to:

select, based on the metadata, a second ML model for analyzing the audio segment; and update the metadata based on the analysis by the second ML model.

3. An audio analysis device, the audio analysis device comprising:

at least one processor; and memory comprising a plurality of instructions that, when executed by the at least one processor, are configured to cause the at least one processor to:

receive administrator criteria that specifies an alarm event handling response;

obtain an audio file associated with a monitored security environment;

detect an audio anomaly in the audio file;

in response to detecting the audio anomaly:

generate an audio segment based on the audio anomaly, the audio segment comprising the audio anomaly;

generate metadata based on a first machine learning (ML) model and by assigning, based on the administrator criteria, a respective priority weight to each of a plurality of characteristics associated with the audio segment;

determine that the administrator criteria specifies providing the audio segment and the metadata in an agent portal;

select, based on the administrator criteria and the respective priority weight of each of the plurality of characteristics, a subset of the metadata for rendering in the agent portal; and encode the audio segment and the subset of the metadata for rendering in the agent portal.

4. The audio analysis device of claim 3, wherein the plurality of instructions are further configured to cause the at least one processor to detect the audio anomaly in the audio file using the first ML model.

5. The audio analysis device of claim 3, wherein the plurality of instructions is further configured to cause the at least one processor to:

receive resolution information relating to the audio anomaly; and train, based on the resolution information, the first ML model.

6. The audio analysis device of claim 3, wherein the plurality of instructions is further configured to cause the at least one processor to:

receive at least one change to the first ML model;

perform, based on the at least one change to the first ML model and on determining not to transmit, a further analysis of the audio file; and based on the further analysis, one of transmit the audio file to an agent device or mark the audio file for deletion.

7. The audio analysis device of claim 3, wherein at least one of the characteristics comprises at least one of:

a description of the audio anomaly;

a secret phrase;

a description of at least one other sound in the audio segment;

a location where the audio file was recorded;

an identity of at least one person present at the location;

a number of distinct speakers having voices present in the audio segment;

a distance between a source of the audio anomaly and the audio recording device; or an identity of at least one background noise in the audio segment.

8. The audio analysis device of claim 3, wherein the plurality of instructions are further configured to cause the at least one processor to:

select, based on the metadata, a second ML model for analyzing the audio segment; and update the metadata based on the analysis by the second ML model.

9. The audio analysis device of claim 3, wherein the plurality of instructions are further configured to cause the at least one processor to select a subset of the metadata by at least selecting individual ones of the characteristics that have a respective priority weight above a priority threshold, the priority threshold being based on the administrator criteria.

10. The audio analysis device of claim 3, wherein the plurality of instructions is further configured to cause the at least one processor to increase, based on the metadata, a length of the audio segment.

11. A method performed by an audio analysis device, the method comprising:

receiving administrator criteria that specifies an alarm event handling response;

obtaining an audio file associated with a monitored security environment;

detecting an audio anomaly in the audio file;

in response to detecting the audio anomaly;

generating an audio segment based on the audio anomaly, the audio segment comprising the audio anomaly;

generating metadata, based on a first machine learning (ML) model and by assigning, based on the administrator criteria, a respective priority weight to each of a plurality of characteristics associated with the audio segment;

determining that the administrator criteria specifies providing the audio segment and the metadata in an agent portal;

selecting, based on the administrator criteria and the respective priority weight of each of the plurality of characteristics, a subset of the metadata for rendering in the agent portal; and encoding the audio segment and the subset of the metadata for rendering in the agent portal.

12. The method of claim 11, further comprising detecting the audio anomaly in the audio file using the first ML model.

13. The method of claim 11, further comprising:

receiving resolution information relating to the audio anomaly; and training, based on the resolution information, the first ML model.

14. The method of claim 11, further comprising:

receiving at least one change to the first ML model;

performing, based on the at least one change to the first ML model and on determining not to transmit, a further analysis of the audio file; and based on the further analysis, one of transmitting the audio file to an agent device or marking the audio file for deletion.

15. The method of claim 11, wherein at least one of the characteristics comprises at least one of:

a description of the audio anomaly;

a secret phrase;

a description of at least one other sound in the audio segment;

a location where the audio file was recorded;

an identity of at least one person present at the location;

a number of distinct speakers having voices present in the audio segment;

a distance between a source of the audio anomaly and the audio analysis device; or an identity of at least one background noise in the audio segment.

16. The method of claim 11, further comprising:

selecting, based on the metadata, a second ML model for analyzing the audio segment; and updating the metadata based on the analysis by the second ML model.

17. The method of claim 16, further comprising selecting a subset of the metadata by at least selecting individual ones of the characteristics that have a respective priority weight above a priority threshold, the priority threshold being based on the administrator criteria.

18. The method of claim 11, further comprising increasing, based on the metadata, a length of the audio segment.

\* \* \* \* \*